Jan. 5, 1943. I. F. WELLER 2,307,553
WELDING APPARATUS
Filed Dec. 30, 1941

Inventor:
Irving F. Weller,
by Harry E. Dunham
His Attorney.

Patented Jan. 5, 1943

2,307,553

UNITED STATES PATENT OFFICE 2,307,553

WELDING APPARATUS

Irving F. Weller, Schenectady, N. Y., assignor to General Electric Company, a corporation of New York Application December 30, 1941, Serial No. 424,907

8 Claims. (Cl. 219—14)

My invention relates to welding apparatus and more particularly to gas-arc welding apparatus.

In gas-arc welding, a gaseous medium is supplied to and about the welding arc during the welding operation. One form of gas-arc welding for which my apparatus is particularly suited is known as atomic hydrogen welding. In atomic hydrogen welding use is made of the heating effects resulting from the recombination of hydrogen which has been dissociated through the agency of some suitable means such as an electric arc.

It is an object of my invention to provide gas-arc welding apparatus which is extremely light, compact and easily manipulated.

It is a further object of my invention to provide a gas-arc welding torch of improved construction.

Figure 1:
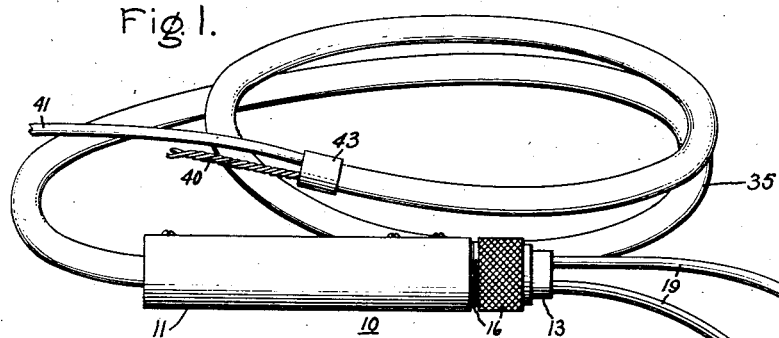
Figure 3:
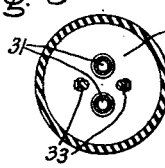
Figure 4:
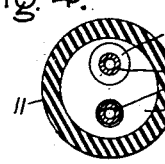
Figure 5:
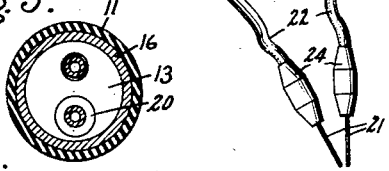
Figure 2:
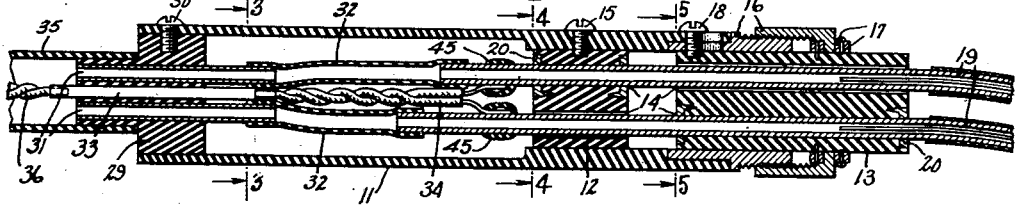
Figure 6:
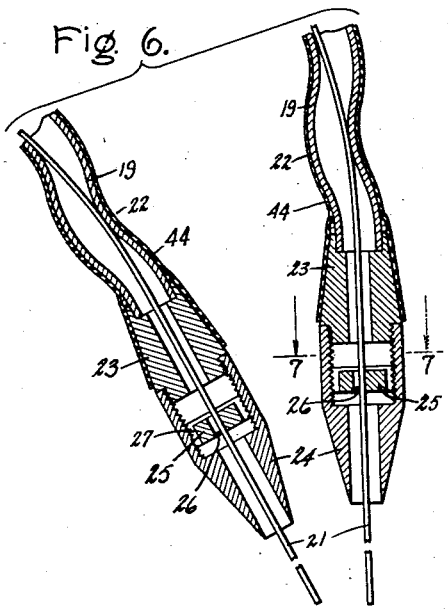
Figure 7:
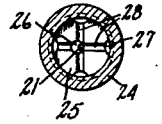
Figure 8:
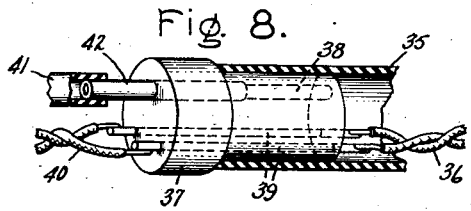

Further objects of my invention will become apparent from a consideration of the construction of the gas-arc welding torch and the flexible connection for supplying gas and electricity thereto illustrated in Fig. 1 of the accompanying drawing. Fig. 2 of this drawing is a cross-sectional view of the handle portion of the torch shown in Fig. 1, Figs. 3, 4 and 5 are cross-sectional views of Fig. 2 along the lines 3—3, 4—4 and 5—5 thereof, Fig. 6 is a cross-sectional view of the nozzle structure and electrode-holding portion of the metallic tubes forming part of the torch, Fig. 7 is a cross-sectional view along lines 7—7 of Fig 6 showing additional features of the electrode-positioning disk located in each of the nozzles, and Fig. 8 is a view with parts broken away showing the arrangement for introducing gas and electricity into one end of the hose whose other end is connected to the welding torch.

The gas-arc welding apparatus illustrated in the drawing comprises a torch and its flexible hose connection through which gas and electricity are supplied thereto. The torch is provided with a pair of electrode-holding gas-conducting metallic tubes having parallel portions located within the handle of the torch and curved portions which project beyond the handle and are angularly disposed relatively to one another at their ends. Angularly disposed nozzles are attached to the ends of these tubes. The arcing terminals of electrodes inserted through the nozzles and curved portions of the tubes are held thereby in a desired angular position relative to one another, and gas supplied through the tubes and nozzles is directed about these arcing terminals and the arc established therebetween.

Means are provided in the handle of the torch for moving the parallel portions of the tubes lengthwise of one another. Means are also provided in the handle of the torch for supplying gas and electricity to these tubes. This means is so constructed that it permits the relative lengthwise movements of the electrode-holding gas-conducting metallic tubes. This means terminates in a manifold located in the other end of the handle. The gas hose and flexible conductors enclosed therein are attached to this manifold.

The gas-arc welding torch 10 illustrated in the drawing comprises a handle 11 which constitutes a support for a pair of relatively movable tube supporting members 12 and 13 located therein. These members have parallel passageways 14 which are aligned with one another. One of these tube supporting members 12 is attached by a screw 15 within one end of handle 11, and the other tube supporting member 13 projects from the same end of the handle and is movable lengthwise thereof. Telescoping screw members 16, making a threaded engagement with one another, are employed for moving these tube supporting members relatively to one another. One of these screw members is attached to the end of the handle 11 and the other is rotatably supported on and lengthwise movable with the tube supporting member 13, being mounted thereon between collars 17 which are attached thereto. A screw 18 passing through a slot extending lengthwise of handle 11 engages tube supporting member 13 and prevents it from turning in handle 11 while yet permitting lengthwise movement thereof in the handle.

A pair of electrode-holding, gas-conducting metallic tubes 19 are supported by the relatively movable members 12 and 13. These tubes have parallel portions which extend through aligned parallel passageways in the tube supporting members, one tube being attached to one of these members and movable lengthwise of the other thereof and the other tube being attached to the other of these members and movable lengthwise of said one thereof. The attachment between these tubes and their support members is accomplished through washers 20, although other means may be employed. These washers are soldered or otherwise affixed to the outside surface of the metallic tubes and are countersunk at the ends of the aligned parallel passageways in the tube supporting members to which they are also affixed by pointed claws.

Metallic tubes 19 are also provided with electrode-holding curved portions which project beyond tube supporting members 12 and 13 and are angularly disposed relatively to one another at their ends. The passageways in these tubes are larger than the electrodes 21 which they are adapted to hold, and each of the tubes has near its end a crooked portion 22 which forms, within the tubes, offset electrode deflecting portions which frictionally engage and hold the electrodes 21 in the passageways. The electrodes are preferably made of flexible rods of tungsten.

The angularly disposed ends of metallic tubes 19 are provided with nipples 23 having threaded end portions which extend into and engage the threaded side walls of cavities in nozzles 24. These cavities form parts of angularly disposed passageways in the nipples and nozzles which, like those passageways in tubes 19, are larger than electrodes 21 which they are adapted to accommodate. Rotatably adjustable members 25, for example disks having threaded peripheries which engage the threaded side walls of the cavities in nozzles 24, are provided with eccentric electrode passageways 26 for engaging the electrodes and positioning them relatively to the passageways through nipples 23 and nozzles 24. The threaded edge periphery of each of these disks is provided with notches or passageways 27 for the flow of gas from one side thereof to the other. The upper portions of disks 25 are also provided with slots 28 which extend between the notches and across the eccentric electrode passageways 26. The blade of a screw driver or some similar instrument placed in these slots 28 may be employed for adjusting the disks 25 relatively to the nozzles 24 within which they are located so as to locate the eccentric electrode passageway therein in the desired position for holding electrodes 21 centrally of the passageways through nipples 23 and nozzles 24. This adjustment is required by reason of the curved passageway and electrode-holding surfaces in tubes 19.

Gas and electricity are supplied to these tubes 19 through a manifold 29 held in the other end of handle 11 by a screw 30. The gas passageways formed by tubes 31 having a gas tight fit in this manifold are connected by flexible hoses 32 to the ends of tubes 19 within the handle. The flexible hoses 32 may be of any suitable construction; for example, they may be made of rubber to accommodate the limited lengthwise movement of one of the tubes 19 relatively to the handle and manifold 29 therein. A pair of electrical conductors 33 make a gas tight fit with and extend through this manifold. They are connected by a pair of flexible electrical conductors 34 to the ends of tubes 19. These flexible conductors 34 accommodate the limited movement of one of the tubes 19 lengthwise of the handle.

Gas and electricity are supplied to the torch 10 through a hose 35 one end of which encloses a reduced end portion of the manifold 29. This hose encloses a pair of flexible electrical conductors 36 whose terminals are connected to the portions of conductors 33 extending beyond the reduced end portion of the manifold. The other end of this hose is closed by a plug 37 (Fig. 8) through which extends a gas passageway 38 and a pair of conductors 39 which make a gas tight fit therewith. These conductors are connected with the other terminals of the flexible conductors 36 within hose 35. The ends of the conductors extending beyond the head of plug 37 are connected by another pair of conductors 40 to a source of arc current and voltage. A gas hose 41 is connected with passageway 38 in plug 37 through the agency of a tube 42 inserted in and making a gas tight fit with the head portion of plug 37. As shown in Fig. 1 the head of this plug may be provided with a sleeve 43 for shielding the gas and electrical connections therewith.

Handle 11, tube supporting members 12, 13 and manifold 29 are made of insulating material such as Textolite, Bakelite, fiber, or some similar insulating material. The projecting curved end portions of the metallic tubes 19 and nipples 23 are also preferably coated with a layer of electrically insulating enamel 44. Screw members 16, collars 17, washers 20, and manifold tubes 31 are preferably made of metal. The terminals of conductors 34 which are attached to the inner ends of tubes 19 are preferably insulated from one another by a covering 45 of insulating material. Plug 37 may also be made of insulating material.

While the torch is preferably made of the materials above specified, it is of course, apparent that a wide latitude in selection of materials may be exercised. It is necessary, however, to insulate the current conducting parts of opposite polarity from one another as well as from the operator and the work, since in this way damage to the torch and the work and injury to the operator are avoided.

Electrodes 21 are inserted into the curved end portion of tubes 19 through the discharge ends of nozzles 24. These electrodes are held in tubes 19 by the electrode deflecting surfaces formed by the crooked portions 22 at the ends of these tubes. The electrodes should extend from the nozzles a certain amount such as illustrated in Fig. 1, and by manipulating screw members 16 the tubes 19 may be moved relative to one another to bring the arcing terminals of the electrodes together and then separate them to strike an electric arc. It is not necessary, however, to manipulate the screw members in order to strike the arc if the electrodes, with a proper separation for the desired arc, are brought into engagement with or wiped across the charred surface of a wooden block. The screw members also provide an adjustment for moving the electrodes toward one another as they are slowly consumed. After the electrodes have been consumed a certain amount, it will be necessary to interrupt the welding operation and withdraw the electrodes from the nozzles and tubes by means of a pair of pliers, or the like, so that they again assume a position relative to one another such as shown, for example, in Fig. 1. Gas supplied through tubes 19, is discharged about the arcing terminals of the electrodes 21 and the arc established therebetween.

In atomic hydrogen welding the gas is hydrogen or a gas mixture containing hydrogen. An arc established in the presence of hydrogen dissociates it to its molecular state and this molecular hydrogen recombines with the liberation of a large amount of heat a short distance away from the arc. If a gas mixture including hydrogen is used it is desirable to have little or no oxygen therein, since the presence of oxygen inhibits the formation of any substantial amount of atomic hydrogen. It is, of course, apparent that the apparatus disclosed may be used for other forms of gas-arc welding in which the combined heating effects of the arc and the combustion of gas are employed for welding.

The apparatus above described is extremely light, compact and easily manipulated. The flexible hose and conductors enclosed therein add little to the weight of the torch. In fact, the cooling effect of the gas flowing through hose 35 makes it possible to use conductors 36 of much smaller size than would be possible if these conductors were outside of the hose and provided with the necessary wear resisting layers of insulation. The torch itself is small, compact and perfectly balanced by reason of the arrangement of parts therein. Furthermore, the lengthwise adjustment of the tubes by the means provided or their equivalent means greatly decreases the size of the torch and streamlines its over all dimensions. There are no protruding parts to catch or engage the work when the torch is used in confined quarters to join closely spaced parts such as the complicated assemblies of airplane structures or the like.

Modifications of my invention above described will occur to those skilled in the art in view of the particular arrangement illustrated. I aim, therefore, in the appended claims to cover all such modifications as fall within the true spirit and scope of my invention.

What I claim as new and desire to secure by Letters Patent of the United States, is:

1. Welding apparatus comprising a pair of relatively movable members each having therein a pair of parallel passageways which are aligned with one another, a pair of metallic tubes having parallel portions extending through said aligned parallel passageways and electrode-holding curved portions which project beyond said members and are angularly disposed relatively to one another at their ends, said parallel portion of one of said tubes being attached to one of said members and movable lengthwise of the other of said members, said parallel portion of the other of said tubes being attached to the other of said members and movable lengthwise of said one of said members and said curved portions of said tubes being adapted to enclose electrodes which project from their said angularly disposed ends in angular positions relative to one another, a support for said members, means mounted on one of said members and acting on the other of said members for moving them relatively to one another along said parallel portions of said tubes, and means for supplying electricity to said tubes.

2. Gas-arc welding apparatus comprising a pair of tube supporting members each of which has therein a pair of parallel passageways which are aligned with one another, a pair of electrode-holding gas-conducting metallic tubes having parallel portions located in said aligned parallel passageways of said members, said parallel portion of one of said tubes being attached to one of said members and movable lengthwise of the other of said members and said parallel portion of the other of said tubes being attached to the other of said members and movable lengthwise of said one of said members, a support for said members, telescoping screw members making a threaded engagement with one another, one of said screw members being attached to one of said tube supporting members and the other of said screw members being rotatably supported on and lengthwise movable with the other of said tube supporting members, and means for supplying gas and electricity to said tubes.

3. Gas-arc welding apparatus comprising a pair of members each having therein parallel passageways which are aligned with one another, a pair of metallic tubes having parallel portions located in said aligned parallel passageways and electrode-holding curved portions which project therefrom and are angularly disposed relative to one another at their ends, said passageways in said tubes being larger than the electrodes said tubes are adapted to hold and having near the ends of said angularly disposed end portions electrode deflecting surfaces which frictionally engage and hold said electrodes, means for attaching one of said members to one of said parallel portions of said tubes which portion is movable through the other of said members, means for attaching the other of said members to the other of said parallel portions of said tubes which portion is movable through said one of said members, a handle within which are the inner ends of said tubes and in which said members are supported, means on said handle for moving one of said members relatively to the other of said members and said handle along said parallel portions of said tubes, and means extending through said handle and engaging the ends of said tubes within said handle for supplying gas and electricity to said tubes.

4. Gas-arc welding apparatus comprising a pair of relatively movable members each having therein a pair of parallel passageways which are aligned with one another, a pair of electrode-holding gas-conducting metallic tubes having parallel portions located in said aligned parallel passageways, said parallel portion of one of said tubes being attached to one of said members and movable lengthwise of the other of said members and said parallel portion of the other of said tubes being attached to the other of said members and movable lengthwise of said one of said members, a handle within which are the inner ends of said tubes and in one end of which said members are located, one of said members being attached to said handle and the other of said members being movable lengthwise thereof, telescoping screw members making a threaded engagement with one another, one of said screw members being attached to said handle and the other of said members being rotatably supported on and lengthwise movable with the other of said members, and means extending through said handle and engaging the ends of said tubes within said handle for supplying gas and electricity to said tubes.

5. Gas-arc welding apparatus comprising a pair of metallic tubes having parallel portions terminating in electrode-holding curved portions which are angularly disposed relatively to one another at their ends, said passageways in said tubes being larger than the electrodes said tubes are adapted to hold, angularly disposed nozzles attached to said angularly disposed end portions of said tubes, said nozzles having passageways therethrough which are larger than the electrodes said tubes are adapted to hold, and a member rotatably adjustable in the passageway of each of said nozzles, said member having an eccentric electrode passageway which engages and positions an electrode extending through its said nozzle and one or more gas passageways which permit the flow of gas through said passageway in its said nozzle.

6. Gas-arc welding apparatus comprising a pair of metallic tubes having parallel portions terminating in electrode-holding curved portions which are angularly disposed relatively to one another at their ends, said passageways in said tubes being larger than the electrodes said tubes are adapted to hold and having near the ends of said angularly disposed portions of said tubes electrode deflecting surfaces which frictionally engage said electrodes, angularly disposed nozzles attached to said angularly disposed end portions of said tubes, said nozzles having passageways therethrough which are larger than the electrodes said tubes are adapted to hold, a disk rotatably adjustable in said passageway in each of said nozzles, said disk having an eccentric electrode passageway which engages and positions an electrode extending through its said nozzle and one or more gas passageways which permit the flow of gas through said passageway in its said nozzle, a pair of relatively movable tube supporting members each having therein a pair of parallel passageways which are aligned with one another for the reception of said parallel portions of said tubes, one of said members being attached to one of said tubes in one of said aligned passageways and movable lengthwise of the other of said tubes in the other of said aligned passageways and the other of said members being attached to the other of said tubes in the other of said aligned passageways and movable lengthwise of said one of said tubes in said one of said aligned passageways, a handle in which the inner ends of said tubes and said tube supporting members are located, means for moving one of said members relatively to the other of said members and said handle along said parallel portions of said tubes, and means extending through said handle and engaging the ends of said tubes within said handle for supplying gas and electricity to said tubes.

7. Gas-arc welding apparatus comprising a pair of metallic tubes having parallel portions terminating in electrode-holding curved portions which are covered with electrical insulating material and are angularly disposed relatively to one another at their ends, said passageways in said tubes being larger than the electrodes said tubes are adapted to hold, angularly disposed nozzles attached to the angularly disposed end portions of said tubes, said nozzles having passageways therethrough which are larger than the electrodes said tubes are adapted to hold, a disk rotatably adjustable in said passageway in each of said nozzles, said disk having an eccentric electrode passageway which engages and positions an electrode extending through its said nozzle and one or more gas passageways which permit the flow of gas through said passageway in its said nozzle, a pair of relatively movable tube supporting members each of which is formed of electrical insulating material and has therein a pair of parallel passageways aligned with one another for the reception of said parallel portions of said tubes, one of said members being attached to one of said tubes in one of said aligned passageways and movable lengthwise of the other of said tubes in the other of said aligned passageways and the other of said members being attached to the other of said tubes in the other of said aligned passageways and movable lengthwise of said one of said tubes in said one of said aligned passageways, telescoping screw members making a threaded engagement with one another, one of said screw members being attached to one of said tube supporting members and the other of said screw members being rotatably supported on and lengthwise movable with the other of said tube supporting members, a handle of electrical insulating material within which are the inner ends of said tubes and in one end of which said tube supporting members and said parallel portions of said tubes are located, one of said tube supporting members being attached to said handle and the other of said tube supporting members being movable relatively thereto, a gas manifold in the other end of said handle, said manifold having passageways connected to each of said metallic tube ends in said handle, the connection between said manifold and said tube that is movable in said handle being made of flexible material, insulated electrical conductors extending through said manifold and conductively connected to each of said metallic tubes, said conductor attached to said tube that is movable in said handle being flexible, means for supplying gas to said passageways in said manifold, and means for connecting a source of electric current and voltage to said insulated electrical conductors.

8. Gas-arc welding apparatus comprising a pair of metallic tubes having parallel portions terminating in electrode-holding curved portions which are covered with electrical insulating material and are angularly disposed relatively to one another at their ends, said passageways in said tubes being larger than the electrodes said tubes are adapted to hold and having offset electrode engaging surfaces which frictionally engage and hold said electrodes in said angularly disposed end portions of said tubes, angularly disposed nozzles attached to said angularly disposed end portions of said tubes, said nozzles having passageways therethrough which are larger than the electrodes said tubes are adapted to hold, a disk rotatably adjustable in said passageway in each of said nozzles, said disk having an eccentric electrode passageway which engages and positions an electrode extending through its said nozzle and one or more gas passageways which permit the flow of gas through said passageway in its said nozzle, a pair of relatively movable tube supporting members formed of electrical insulating material and having therein a pair of parallel passageways which are aligned with one another for the reception of said parallel portions of said tubes, one of said members being attached to one of said tubes in one of said aligned passageways and movable lengthwise of the other of said tubes in the other of said aligned passageways and the other of said members being attached to the other of said tubes in the other of said aligned passageways and movable lengthwise of said one of said tubes in said one of said aligned passageways, telescoping screw members making a threaded engagement with one another, one of said screw members being attached to one of said tube supporting members and the other of said screw members being rotatably supported on and lengthwise movable with the other of said tube supporting members, a handle of electrical insulating material within which are the inner ends of said tubes and in one end of which said tube supporting members and said parallel portions of said tubes are located, one of said tube supporting members being attached to said handle and the other of said tube supporting members being movable relative thereto, a gas manifold in the other end of said handle, said manifold having passageways connected to each of said metallic tube ends in said handle, the connection between said manifold and said tube that is movable in said handle being made of flexible material, insulated electrical conductors extending through said manifold and conductively connected to each of said metallic tubes, the conductor attached to said tube that is movable in said handle being flexible, a flexible gas hose one end of which is attached to said manifold and the other end of which is closed by a plug having a passageway through which gas is supplied to said hose, electrical conductors insulated from one another and extending through said plug and flexible electrical conductors insulated from one another and extending through said hose, a terminal of each of said conductors being electrically connected to each of said conductors in said plug and said manifold.

IRVING F. WELLER.